United States Patent [19]

Toyoda et al.

[11] Patent Number: 5,212,243
[45] Date of Patent: May 18, 1993

[54] POWDER COATING WHICH IS EXCELLENT IN STAIN RESISTANCE

[75] Inventors: Yuji Toyoda, Takatsuki; Akimitsu Uenaka; Hideki Ichimura, both of Suita; Tasaburo Uneo, Sakai; Koichi Tsutsui, Kyoto, all of Japan

[73] Assignee: Nippon Paint Co., Ltd., Japan

[21] Appl. No.: 894,470

[22] Filed: Jun. 5, 1992

[30] Foreign Application Priority Data

Jun. 6, 1991 [JP] Japan .................................. 3-233669

[51] Int. Cl.$^5$ ............................................. C08L 75/04
[52] U.S. Cl. ..................................... 525/187; 525/190
[58] Field of Search ................................. 525/187, 190

[56] References Cited

U.S. PATENT DOCUMENTS 3,475,519 10/1969 Noland et al. ....................... 525/187

FOREIGN PATENT DOCUMENTS 178361 2/1990 Japan .
16778 4/1990 Japan .

*Primary Examiner*—Maurice J. Welsh
*Attorney, Agent, or Firm*—Townsend, Snider & Banta

[57] ABSTRACT

A powder coating which is specifically useful for the containing of electric appliance, office appliance and the like and is excellent, inter alia, stain resistance of the formed coating is provided, the powder coating comprising (a) a base resin having a reactive functional group, (b) a hardener having in its molecule 2 or more functional groups which are reactive with the functional group of the base resin and (c) an acrylic resin containing 40 100 % by weight of the total of the constituting monomers of t-butyl acrylate and/or t-butyl methacrylate.

4 Claims, No Drawings

POWDER COATING WHICH IS EXCELLENT IN STAIN RESISTANCE

FIELD OF THE INVENTION

The present invention relates to a powder coating which is excellent in stain resistance and more specifically, it concerns a powder coating which is characterized by containing a particular acrylic resin having, as an essential constituting unit, t-butyl acrylate and/or t-butyl methacrylate, which is excellent in stain resistance and is particularly useful for the coating of electric appliance, office appliance and the like.

BACKGROUND OF THE INVENTION

In the coating of electric appliance, office appliance and the like, powder coating has been widely used. In these areas, coating stain by magic ink and tobacco smoke has often caused serious troubles and there are always big demands to have a powder coating being excellent in stain resistance.

In Japanese Patent Publication (unexamined) No. 16778/90, as a measure for improving stain resistance, there discloses a powder coating comprising a hydroxyl group containing polyester resin and blocked isocyanate hardener, added with an acrylic resin containing a particular amount of hydroxyl group and glycidyl group. This technique is, however, only effective for the powder coating based on hydroxyl containing polyester and blocked isocyanate hardener and no improvement in stain resistance can be expected with other type of powder coating.

In Japanese Patent Publication (unexamined) No. 178361/90, there discloses a technique wherein particular acrylic resin microparticles defined by glass transition temperature and SP vale and having an average diameter of 0.001 to 10 microns are existed on the surfaces of the respective powder coating particles, thereby improving stain resistance of the formed coating. In this method, a high molecular weight acrylic resin is always locatized on the surface of the applied coating and therefore, this technique is very useful for all of polyester, epoxy- and acryl- powder coatings and however, in the preparation of powder coating, there needs an additional step of combining acrylic resin microparticles with the mother powder coating, which always push-up manufacturing cost of the powder coating.

It is, therefore, an object of the invention to provide a powder coating which is excellent in stain resistance, can be easily and economically obtained by following a conventional way, without changing any steps involved, and by using any combinations of base resin and hardener heretofore proposed.

SUMMARY OF THE INVENTION

According to the invention, the abovementioned object can be attained with a powder coating which is excellent in stain resistance, essentially consisting of
  (a) a base resin having a reactive functional group
  (b) a hardener having in its molecule 2 or more functional groups which are reactive with the functional group of the base resin, and
  (c) an acrylic resin, containing 40 to 100% by weight of the total of the constituting monomers of t-butyl acrylate and/or t-butyl methacrylate.

The required amount of the acrylic resin (c) may vary with the type of base resin (a) used. That is, if the base resin (a) is polyester resin or epoxy resin, it should be in a range of 1 to 20% by weight of the base resin, and if the base resin (a) is acrylic resin, then the amount of said resin (c) should preferably be in a range of 1 to 80% by weight of the base resin.

Thus, in the present invention, any of the heretofore proposed polyester resin, epoxy resin and acrylic resin for powder coating may be satisfactorily used.

More specifically, in the case of polyester resin powder coating, one may use a powder coating based on a carboxyl containing polyester resin having a number average molecular weight of 1,000 to 10,000, preferably 1,500 to 8,000, an acid value of 5 to 100 KOH mg/g, and a glass transition temperature of 20° to 100° C., preferably 30° to 80° C., and an epoxy compound or resin having in its molecule 2 or more glycidyl groups; or a hydroxy containing polyester resin having a number average molecular weight of 1,000 to 10,000, preferably 1,500 to 8,000, a hydroxyl value of 5 to 100 KOH mg/g, and a glass transition temperature of 20° to 100° C., preferably 30° to 80° C, and a compound having in its molecule 2 or more isocyanate groups.

If the number average molecular weight of the polyester resin is less than 1,000, there is an undesirable decrease in film strength and if it exceeds over the upper limit of 10,000, it is unable to get a coating with the desired excellent appearance because of the deficient flowability of the coating.

As to the other requirements of the polyester resin, if the acid value or hydroxyl value is less than 5, there is a tendency of decrease in film strength, and if it exceeds over 100, then the lowering in film flexibility and impact strength due to excessively enhanced hardening. If the glass transition temperature is less than 20° C., there is a great decrease in blocking resistance and if it exceeds over 100° C., a great loss in flowability of coating. However, these requirements are very common to the polyester base powder coating and hence, are not of specific to the present powder coating.

As far as the abovementioned requirements are fulfilled, any of the known carboxyl and/or hydroxy bearing polyester resins may be satisfactorily used as a base resin in the present invention.

In preparing such polyester resin, the following acids may be used as a polybasic acid component: terephthalic acid, isophthalic acid, phthalic acid, methyl phthalic acid, trimellitic acid, pyromellitic acid, adipic acid, sebacic acid, succinic acid, maleic acid, fumaric acid, tetrahydrophthalic acid, methyl tetrahydrophthalic acid, hexahydro-phthalic acid, and their reactive derivatives as anhydride, halide, ester and the like.

Examples of polyhydric alcohol used as an alcohol component are ethylene glycol, propylene glycol, 1,3-butanediol, 1,4-butanediol, 1,6-hexanediol, diethylene glycol, dipropylene glycol, 1,4-cyclohexane dimethanol, 1,4-cyclohexane diol, neopentyl glycol, isopentyl glycol, bishydroxyethyl terephthalate, hydrogenated bisphenol A, hydrogenated bisphenol A-alkyleneoxide addtion products, trimethylol ethane, trimethylol propane, glycerine, pentaerythrythol and the like. Such reactive material as polyfunctional compound having both acid and hydroxyl groups may also be used as a starting material. If required, fat or fatty acid may be introduced into the polyester resin through ester exchange reaction, addition reaction and the like.

The polyester resin may be prepared by using known one-step or poly-steps reaction. Any one skilled in the art may be easily obtained the polyester resin which will fulfil the abovementioned requirements, i.e. the designed Tg value by the selection of the type and amounts of starting materials, and number average molecular weight and acid value by the selection of reaction conditions.

As already stated, glycidyl bearing epoxy compound or resin and isocyanate bearing compound may be used as a hardener for the abovementioned polyester resin. Examples of such epoxy compound or resin are reaction product of phenol compound as bisphenol A, phenol novolac and the like and epichlorohydrin; glycidyl ethers obtained by the reaction of an alcohol as ethyleneglycol, propylene glycol, 1,4-butane diol, polyethylene glycol, polypropylene glycol, neopentyl glycol, glycerin and the like and epichlorohydrin; glycidyl esters obtained by the reaction of a carboxylic acid as succinic acid, adipic acid, sebacic acid, phthalic acid, terephthalic acid, hexahydrophthalic acid, trimellitic acid and the like and epichlorohydrin; reaction product of a hydroxycarboxylic acid as p-oxybenzoic acid, β-oxy naphthoic acid, and the like and epichlorohydrin; triglycidyl isocyanurate and its derivatives.

Examples of isocyanate bearing compound are 3-isocyanate methyl-3,5,5-trimethyl-cyclohexyl isocyanate, toluene diisocyanate, xylene diisocyanate, diphenylmethane diisocyanate, hexamethylene diisocyanate and their derivatives reacted with such alcohol as ethyleneglycol, prolylene glycol, dipropylene glycol, butylene glycol, trimethylol propane, hexane triol, glycerin, sorbitol and the like; and urethodione containing polyisocyanates as urethodione diisocyanate, urethodione toluylene diisocyanate, urethodione hexamethylene diisocyanate and the like. They are usually employed in the form blocked with a blocking agent as ε-caprolactam, phenol, benzylalcohol, methyl ethyl ketoxime and the like.

In this invention, the base resin and the hardener are, as in the conventional powder coating, used in a weight ratio so as to give the functional group ratio of carboxyl group of the polyester resin/glycidyl group of three epoxy compound or resin or hydroxy group of the polyester resin/isocyanate group of the polyisocyanate compound plus isocyanate group derived from the urethodione group of the urethodione bearing polyisocyanate through dissociation, if any, of 0.5 to 2.0, and preferably 0.5 to 1.5.

In the case of epoxy powder coating, an epoxy resin having a number average molecular weight of 1,000 to 10,000 and having in its molecule 2 or more glycidyl groups is used in combination with dicyandiamide or organic acid hydrazide, hardener.

Examples of epoxy resin having in its molecule 2 or more glycidyl groups are the reaction product of a phenol compound, as bisphenol A and its hydrogenated product, phenol novolac and the like, and epichlorohydrin; the reaction product of a cresol compound, as cresol novolac and the like, and epichlorohydrin and the like.

Examples of organic acid hydrazides are adipic acid dihydrazide, sebacic acid dihydrazide, isophthalic acid dihydrazide and the like. The epoxy resin and the hardener are compounded in the functional group ratio of glycidyl of the epoxy resin/active hydrogen of the dicyandiamide or organic acid hydrazide of 0.5 to 2.0, preferably 0.5 to 1.5.

This is because, if the ratio is less than 0.5, there is undesired decrease in film hardeness, and if it exceeds over 2.0, there results too excess hardening, resulting the decrease in flexibility, impact strength and the like.

Typical examples of acrylic powder coating are the powder based on an acrylic resin having in its molecule 2 or more glycidyl groups and having a number average molecular weight of 1,000 to 30,000 and a glass transition temperature of 20° to 120° C. and a compound and/or resin having in its molecule 2 or more carboxyl groups; the powder based on an acrylic resin having in its molecule 2 or more carboxylic groups and having a number average molecular weight of 1,000 to 30,000, an acid value of 5 to 200 KOH ml/g and a glass transition temperature of 20° to 120° C. and an epoxy resin and/or compound having in its molecule 2 or more glycidyl groups; and the powder based on an acrylic resin having in its molecule 2 or more hydroxyl groups and having a number average molecular weight of 1,000 to 30,000, a hydroxyl value of 5 to 200 KOH mg/g and a glass transition temperature of 20° to 120° C. and a compound having in its molecule 2 or more isocyanate groups.

In the present acrylic powder coating, the heretofore known glycidyl containing-, carboxyl containing- or hydroxyl containing- acrylic resins are satisfactorily used as a base resin.

However, such resin should have a number average molecular weight of 1,000 to 30,000, preferably 1,500 to 8,000, and a glass transition temperature of 20° to 120° C. and preferably 30° to 80° C. Furthermore, in the case of a glycidyl bearing acrylic resin, it should have 20 to 50% by weight of glycidyl containing monomer in the total of its constituting monomers, in the case of carboxyl containing acrylic resin, its acid value should be in a range of 5 to 200 KOH mg/g and preferably 20 to 100 KOH mg/g, and in the case of hydroxyl containing acrylic resin, its hydroxyl value should be in a range of 5 to 200 KOH mg/g and preferably 20 to 100 KOH mg/g. This is because, if the number average molecular weight is less than 1,000, there is undesired deficient in film strength, whereas if it exceeds over 30,000, it is unable to obtain a good appearance coating because of insufficient flowability of the coating. If the glass transition temperature is less than 20° C., there is a marked decrease in blocking resistance, and if it exceeds over 120° C., there is a shortage in flowability of the coating. When the glycidyl containing monomer content is less than 20% by weight, or if the acid value or hydroxyl value is less than 5, there is a marked loss in film strength, whereas if the glycidyl containing monomer content is more than 50% by weight or is the acid value or hydroxyl value exceeds over 200, there results excessively increased hardening, resulting the decrease in flexibility, impact strength and other properties of the formed coating.

As far as the abovementioned requirements are fulfilled, the acrylic resin may be prepared by using any known materials and known methods.

Speaking of the starting materials for the acrylic resin, examples of glycidyl containing monomers are glycidyl acrylate, glycidyl methacrylate, methyl glycidyl acrylate, methyl glycidyl methacrylate, glycidyl ether of allyl alcohol, glycidyl ether of methallyl alcohol, methyl glycidyl ether of allyl alcohol, methyl glycidyl ether of methallyl alcohol, N-glycidyl acrylamide, vinyl sulfonic acid glycidyl and the like; examples of carboxyl containing monomers are acrylic acid, methacrylic acidand the like; and examples of hydroxy containing monomers are 2-hydroxyethyl acrylate, 2- hydroxyethyl methacrylate, hydroxy propyl acrylate, hydroxy propyl methacrylate, hydroxy butyl acrylate, hydroxy butyl methacrylate, allyl alcohol, methallyl alcohol and the like.

Other monomers to be co-polymerized with carboxy containing monomer or glycidyl containing monomer are acrylate or methacrylate, and other ethylenically unsaturated monomers.

They are used each singularly or in the form of combination of two or more. Examples of such acrylate or methacrylate are methyl acrylate, ethyl acrylate, n-propyl acrylate, isopropyl acrylate, n-butyl acrylate, isobutyl acrylate, cyclohexyl acrylate, 2-ethylhexyl acrylate, octyl acrylate, 2-ethyloctyl acrylate, dodecyl acrylate, benzyl acrylate, methyl methacrylate, ethyl methacrylate, n-propyl methacrylate, isopropyl methacrylate, n-butyl methacrylate, isobutyl methacrylate, hexyl methacrylate, cyclohexyl mthacrylate, 2-ethylhexyl methacrylate, octyl methacrylate, 2-ethyloctyl methacrylate, dodecyl methacrylate, lauryl methacrylate, benzyl methacrylate, phenyl methacrylate, 2-hydroxyethyl acrylate, 2-hydroxyethyl methacrylate, 2-hydroxypropyl acrylate, 2-hydroxypropyl methacrylate and the like. Examples of other ethylenically unsaturated monomers are fumaric acid dialkyl esters as diethyl fumarate, dibutyl fumarate and the like; itaconic acid dialkyl esters as diethyl itaconate, dibutyl itaconate and the like; styrene, vinyl toluene, -methyl styrene, acrylonitrile, mathacrylonitrile, acrylamide, methacrylamide, methylol acrylamide, alkoxy methylol amide, vinyl oxazoline, vinyl acetate, vinyl propionate, lauryl vinyl ether and the like. Such fluorine containing monomers as 2,2,2trifluoro acrylate, 2,2,2-trifluoro methacrylate, 1,1,1,3,3,3hexafluoroisopropyl (meth) acrylate and the like, and such reactive silicones as 3-methacryloisooxypropyl dimethoxy methyl silane, 3-methacryloisooxypropyl dimethoxy methyl silane, 3-methacryloisooxypropyl trimethoxy silane and the like may also be used as a specific monomer as desired.

Examples of a compound and/or resin having in its molecule 2 or more carboxyl groups used as a hardener are dibasic acids as glutaric acid, adipic acid, pimelic acid, suberic acid, azelaic acid, sebacic acid, 1,12-dodecane dicarboxylic acid, 1,20-eicosane dicarboxylic acid, succinic acid, maleic acid, citraconic acid, itaconic acid, glutaconic acid phthalic acid, isophthalic acid, hexhydrophthaqlic acid, cyclohexene 1,2-dicarboxylic acid and the like; and polyvalent carboxylic acids as trimellitic acid, and the like. They may be polycarboxylic anhydrides as succinic anhydride, sebacic anhydride, phthalic anhydride, itaconic anhydride, trimellitic anhydride and the like, and may also be polyester resin having in its molecule 2 or more carboxyl groups and the like.

Examples of an epoxy compound or resin having in its molecule 2 or more glycidyl groups or a compound having in its molecule 2 or more isocyanate groups are the hereinbefore stated members in connection with polyester powder coatings.

In this invention, the base resin and the hardener are used so as to give the functional group ratio, i.e. in the case of glycidyl bearing acrylic resin and a compound and/or resin having in its molecule 2 or more carboxyl groups, glycidyl group/carboxyl group; in the case of carboxyl containing acrylic resin and an epoxy compound or resin having in its molecule 2 or more glycidyl groups, carboxyl group/glycidyl group; and in the case of hydroxy containing acrylic resin and an isocyanate compound, hydroxy group/isocyanate group inclusive of the isocyanate group derived from the dissociation of urethodione group if any, of 0.5 to 2.0, and preferably 0.5 to 1.5.

This is because, if the functional group equivalent ratio is less than 0.5, there is a deficient curing and if it exceeds over 2.0, too excessive curing, resulting the decreased film properties as flexibility impact strength and the like.

In this invention, as the most important feature, a particular acrylic resin is compounded with the above-mentioned base resin and hardener, thereby markedly improving stain resistance of the powder coating.

Such acrylic resin is characterized by containing t-butyl acrylate and/or t-butyl methacrylate as its constituting monomer.

No particular requirements on the number average molecular weight, glass transition temperaturear SP value are necessitated for this acrylic resin, providing giving adequate blocking resistance to the formed powder coating. As to the possible functional groups to be beared on this acrylic resin, there is no particular requirement, and however, they are preferably the groups being reactive with the functional groups of the base resin or hardener.

However, such acrylic resin should contain 40 to 100% by weight, preferably 45 to 80% by weight, per total of the constituting monomers of t-butyl acrylate and/or t-butyl methacrylate. In that sense, the present acrylic resin may be a homopolymer or copolymer of t-butyl acrylate and/or t-butyl methacrylate with up to 60% by weight of other copolymerizable ethylenic unsaturation monomers. These copolymerizable monomers may be the same members as already stated in connection with acrylic powder coating. In any way, the content of t-butyl acrylate and/or t-butyl methacrylate should be 40% by weight or more. This is because, if the said content is less than 40% by weight, it is unable to expect the desired level of stain resistance.

Speaking of the acrylic resin content in the present powder coating, in the case of polyester or epoxy resin powder coating, it should be 1 to 20% by weight, and preferably 2 to 15% by weight. If the acrylic resin content is less than 1% by weight, it is unable to obtain the desired level of improvement in stain resistance, and if it exceeds over 20% by weight, there is a tendency of decrease in coating appearance.

In the case of an acrylic powder coating, the content of the said t-butyl acrylate and/or t-butyl methacrylate containing acrylic resin should be 1 to 80% by weight, and preferably 2 to 65% by weight of the powder coating. This is because, if the said acrylic resin content if less than 1% by weight, there is a shortage in stain resistance improving effect, and even if it exceeds over 80% by weight, there is no further improvement in the stain resistance.

In the present powder coating, various known additives may be satisfactorily used. Examples of such additives are (a) surface conditioner for the purpose of prohibiting crater formation, and improving smoothness, as, for example, long chain alkyl acrylates, polysiloxanes and the like (b) coloring matters including inorganic pigments as titanium dioxide, red oxide, yellow iron oxide and the like, and orgaic pigments as carbon black, phthalocyanine blue, phthalocyanine green, quinacridone red pigment and the like (c) plasticizer as polyalkylene polyol, phthalic acid esters and the like
(d) UV absorber, antioxidant
(e) antifoaming agent as benzoin and the like and the like.

In preparing the present powder coating, no particular processes may be required, and the respective starting materials are premixed, fuse-melted at about 100° C., cooled, pulverized and shieved in conventional ways.

The thus obtained powder coating may be applied on a substrate by using any conventional methods of electrostatic spray coating, fluidized bed coating and the like.

Since t-butyl acrylate or methacrylate containing acrylic resin is compounded in the present powder coating, the formed coating is excellent in stain resistance, and gloss retention after alkali test. Highly improved coating can be obtained very economically. The present powder coating may be satisfactorily applied on electric appliances, office appliances and various other substrates.

The invention shall be now more fully explained in the following Examples.

EXAMPLE 1

100 parts by weight (hereinafter the same) of P-7307.3 (carboxyl containing polyester resin Mn=4800, AV 34, manufactured by EMS), 7.5 parts of triglycidyl isocyanurate (TGIC), 4 parts of acrylic resin B obtained by the copolymerization of 15 wt. % of glycidyl methacrylate, 50 wt. % of t-butyl methacrylate, 10 wt. % of styrene, 4 wt. % methyl methacrylate and 21 wt. % of isobutyl acrylate and having a number average molecular weight of 4,500, 60 parts of titanium dioxide CR-50 (pigment, manufactured by Ishihara Sangyo), 1.1 parts of benzoin (antifoaming agent) and 0.4 part of Silicone YF-3919 (surface conditioner, Toshiba Silicone) were premixed and then fuse-mixed in a kneader heated to 100° C., allowed to cool, pulverized and passed through 150 mesh shieve to obtain a powder coating.

This powder was applied on the surface of zinc phosphated steel (0.8 mm phosphate coating) by using an electrostatic spray coating method to 40 micron thickness and then baked at 180° C. for 20 minutes.

Magic stain resistance and tobacco stain resistance of thus obtained coating were evaluated as herein under stated and the test results were shown in Table 3.

EXAMPLE 2

The similar experiment as stated in Example 1 was repeated excepting changing the amount of the acrylic resin B from 4 parts to 15 parts.

EXAMPLE 3

The similar experiment as stated in Example 1 was repeated excepting substituting 2 parts of the acrylic resin C obtained by the copolymerization of 15% by weight of glycidyl methacrylate and 85% by weight of t-butyl methacrylate and having a number average molecular weight of 4,500 for 4 parts of the acrylic resin B.

EXAMPLE 4

The similar experiment as stated in Example 1 was repeated substututing 2 parts of the acrylic resin D which was a homopolymer of t-butyl methacrylate and having a number average molecular weight of 4,500 for 4 parts of the acrylic resin B.

EXAMPLE 5

The similar experiment as stated in Example 1 was repeated excepting substituting 4 parts of the acrylic resin E obtained by the copolymerization of 15% by weight of glycidyl methacrylate, 50% by weight of t-butyl acrylate, 10% by weight of styrene, 4% by weight of methyl acrylate and 21% by weight of isobutyl acrylate and having a number average molecular weight of 4,500 for 4 parts of the acrylic resin B.

EXAMPLE 6

Using 50 parts of M-8520 (carboxyl containing polyester resin, Mn=2600, AV 76, manufactured by Dainihon Ink), 50 parts of AER-664P (bisphenol A type epoxy resin, epoxy equivalent 950 g/eq., manufactured by Asahi Kasei), 4 parts of the acrylic resin B, 50 parts of CR-50, 0.3 part of Curezole C-17Z (hardening catalyst, manufactured by Shikoku Kasei), 1.1 parts of benzoin and 0.4 part of Silicone YF-3919, the same procedures as stated in Example 1 were repeated to obtain a powder coating. This was applied on a zinc phosphated steel and evaluated as in Example 1.

EXAMPLE 7

Using 100 parts of M-8076 (hydroxy containing polyester resin Mn=4000, HO value 37, manufactured by Dainihon Ink), 33 parts of Crelan UI-B (isocyanate compound, NCO=11.5%, manufactured by Bayer), 4 parts of the acrylic resin F obtained by the copolymerization of 15% by weight of 2-hydroxyethyl methacrylate, 50% by weight of t-butyl methacrylate, 10% by weight of styrene, 4% by weight of methyl methacrylate and 21% by weight of isobutyl acrylate and having a number average molecular weight of 4,500, 75 parts of CR-50, 0.3 part of dibutyl tin dilaurate (hardening catalyst), 1.1 parts of benzoin and 0.4 part of Silicone YF-3919, the same procedures as stated in Example 1 were repeated to obtain a powder coating. This was applied on a zinc phosphated steel and evaluated as in Example 1.

EXAMPLE 8

Using 100 parts of AER-664P, 3.3 parts of dicyandiamide, 1.5 parts of D-210 (dicyandiamide modified hardner, manufactured by Asahi Kasei), 4 parts of the acrylic resin B, 75 parts of CR-50, 1.1 parts of benzoin and 0.4 part of YF-3919, the same procedures as stated in Example 1 were repeated to obtain a powder coating. This was applied on a zinc phosphated steel and evaluated as in Example 1.

EXAMPLE 9

Using 30 parts of the glycidyl containing acrylic resin A (Mn=2800, Tg=60) obtained by the copolymerization of 30% by weight of glycidyl methacrylate, 25% by weight of styrene, 32.7% by weight of methyl methacrylate, 6.7% by weight of n-butyl methacrylate and 5.6% by weight of 2-ethylhexyl methacrylate, 70 parts of the glycidyl containing acrylic resin G (Mn=2800, Tg=60) obtained by the copolymerization of 30% by weight of glycidyl methacrylate, 10% by weight of styrene, 2.1% by weight of methyl methacrylate, 50% by weight of t-butyl methacrylate, and 7.9% by weight of isobutyl methacrylate, 15.9 parts of decanedicarboxylic acid, 44 parts of CR-50, 0.5 part of benzoin and 0.7 part of YF-3919, the same procedures as stated in Example 1 were repeated to obtain a powder coating.

This was applied on a zinc phosphated steel and evaluated as in Example 1.

EXAMPLE 10

Using 100 parts of the acrylic resin A, 15.9 parts of decane dicarboxylic acid, 4 parts of the acrylic resin D, 44 parts of CR-50, 0.5 part of benzoin and 0.7 part of YF-3919, the same procedures as stated in Example 1 were repeated to obtain a powder coating. This was applied on a zinc phosphated steel and evaluated as in Example 1.

COMPARATIVE EXAMPLE 1

The similar experiment as stated in Example 1 was repeated and however, in this example, 4 parts of the acrylic resin B were not used.

COMPARATIVE EXAMPLE 2

The similar experiment as stated in Example 1 was repeated and however, in this example, 4 parts of the acrylic resin B were substituted with 4 parts of the acrylic resin H obtained by the copolymerization of 15% by weight of glycidyl methacrylate, 10% by weight of styrene, 11.8% by weight of methyl methacrylate, 49.1% by weight of isobutyl methacrylate, and 14.1% by weight of n-butyl methacrylate and having Mn=4500, Tg=50 and SP=9.7.

COMPARATIVE EXAMPLE 3

The similar experiment as stated in Example 6 was repeated and however, in this example, 4 parts of the acrylic resin B were not used.

COMPARATIVE EXAMPLE 4

The similar experiment as stated in Example 7 was repeated and however, in this example, 4 parts of the acrylic resin F were not used.

COMPARATIVE EXAMPLE 5

The similar experiment as stated in Example 8 was repeated and however, in this example, 4 parts of the acrylic resin B were not used.

COMPARATIVE EXAMPLE 6

The similar experiment as stated in Example 10 was repeated and however, in this example, 4 parts of the acrylic resin D were not used. Compositions of the powder coatings of the abovementioned Examples and Comparative Examples are shown in the following Tables 1 to 2.

TABLE 1

| Example No. | 1 | 2 | 3 | 4 | 5 | 6 | 7 | 8 | 9 | 10 |
|---|---|---|---|---|---|---|---|---|---|---|
| P-7307.3 | 100 | 100 | 100 | 100 | 100 | — | — | — | — | — |
| M-8520 | — | — | — | — | — | 50 | — | — | — | — |
| M-8076 | — | — | — | — | — | — | 100 | — | — | — |
| AER-664P | — | — | — | — | — | 50 | — | 100 | — | — |
| acrylic resin A | — | — | — | — | — | — | — | — | 30 | 100 |
| triglycidyl isocyanurate | 7.5 | 7.5 | 7.5 | 7.5 | 7.5 | — | — | — | — | — |
| Crelan UI-B | — | — | — | — | — | — | 33 | — | — | — |
| dicyandiamide | — | — | — | — | — | — | — | 3.3 | — | — |
| decane dicarboxylic acid | — | — | — | — | — | — | — | — | 15.9 | 15.9 |
| acrylic resin B | 4 | 15 | — | — | — | 4 | — | 4 | — | — |
| acrylic resin C | — | — | 2 | — | — | — | — | — | — | — |
| acrylic resin D | — | — | — | 2 | — | — | — | — | — | 4 |
| acrylic resin E | — | — | — | — | 4 | — | — | — | — | — |
| acrylic resin F | — | — | — | — | — | — | 4 | — | — | — |
| acrylic resin G | — | — | — | — | — | — | — | — | 70 | — |
| CR-50 | 60 | 60 | 60 | 60 | 60 | 50 | 75 | 75 | 44 | 44 |
| Curezole C17Z | — | — | — | — | — | 0.3 | — | — | — | — |
| dibutyl tin dilaurate | — | — | — | — | — | — | 0.5 | — | — | — |
| D-201 | — | — | — | — | — | — | — | 1.5 | — | — |
| benzoin | 1.1 | 1.1 | 1.1 | 1.1 | 1.1 | 1.1 | 1.1 | 1.1 | 0.5 | 0.5 |
| YF-3919 | 0.4 | 0.4 | 0.4 | 0.4 | 0.4 | 0.4 | 0.4 | 0.4 | 0.7 | 0.7 |

TABLE 2

| Comp. Ex. No. | 1 | 2 | 3 | 4 | 5 | 6 |
|---|---|---|---|---|---|---|
| P-7307.3 | 100 | 100 | — | — | — | — |
| M-8520 | — | — | 50 | — | — | — |
| M-8076 | — | — | — | 100 | — | — |
| AER-664P | — | — | 50 | — | 100 | — |
| acrylic resin A | — | — | — | — | — | 100 |
| triglycidyl isocyanurate | 7.5 | 7.5 | — | — | — | — |
| Crelan UI-B | — | — | — | 33 | — | — |
| dicyandiamide | — | — | — | — | 3.3 | — |
| decane dicarboxylic acid | — | — | — | — | — | 15.9 |
| acrylic resin H | — | 4 | — | — | — | — |
| CR-50 | 60 | 60 | 50 | 75 | 75 | 44 |
| Curezole C17Z | — | — | 0.3 | — | — | — |
| dibutyl tin dilaurate | — | — | — | 0.5 | — | — |
| D-201 | — | — | — | — | 1.5 | — |
| benzoin | 1.1 | 1.1 | 1.1 | 1.1 | 1.1 | 0.5 |
| YF-3919 | 0.4 | 0.4 | 0.4 | 0.4 | 0.4 | 0.7 |

Evaluation of the stain resistance of the respective coating: Test methods used and evaluation standards are as follows:

Magic Ink Stain Resistance:

The formed coating was stained with a magic ink and after standing for 24 hours, the coating was lightly swabbed with a methanol-impregnated gauze and then the remained stain was observed Evaluation Standards:

| 5: no stain | 4: almost no stain | 3: slight stain |
|---|---|---|
| 2: many stains | 1: fully stained | |

Tobacco Smoke Stain Resistance:

The test coating was placed in a closed vessel filled with tobacco smoke (two cigarettes smoke) for 24 hours. Then, the coating was washed with detergent and water and thereafter, color difference (E) between pro and post test coating was measured.

The test results are shown in the following Table 3.

TABLE 3

| | magic ink stain resistance | | | |
|---|---|---|---|---|
| | black | blue | red | tobacco smoke stain resistance |
| Ex. 1 | 4 | 5 | 4 | 0.97 |
| Ex. 2 | 5 | 5 | 5 | 0.12 |
| Ex. 3 | 4 | 5 | 4 | 0.48 |
| Ex. 4 | 4 | 5 | 4 | 0.38 |
| Ex. 5 | 4 | 5 | 4 | 0.93 |
| Ex. 6 | 3 | 4 | 4 | 1.02 |
| Ex. 7 | 5 | 5 | 4 | 0.87 |
| Ex. 8 | 4 | 5 | 4 | 1.12 |
| Ex. 9 | 5 | 5 | 5 | 0.08 |
| Ex. 10 | 4 | 5 | 5 | 1.03 |
| Com. Ex. 1 | 2 | 2 | 1 | 8.85 |
| Com. Ex. 2 | 2 | 2 | 1 | 8.27 |
| Com. Ex. 3 | 1 | 2 | 1 | 9.35 |
| Com. Ex. 4 | 2 | 2 | 1 | 8.27 |
| Com. Ex. 5 | 1 | 2 | 1 | 8.36 |
| Com. Ex. 6 | 2 | 3 | 2 | 4.27 |

What is claimed is:

1. A powder coating which is excellent in stain resistance, essentially consisting of (a) a base resin having a reactive functional group (b) a hardener having in its molecule 2 or more functional groups which are reactive with the functional group of the base resin, and (c) an acrylic resin, containing 40 to 100% by weight of the total of the constituting monomers of t-butyl acrylate and/or t-butyl methacrylate.

2. A powder coating according to claim 1, wherein the base resin (a) is a polyester resin having carboxyl and/or hydroxyl groups, the hardener (b) is a compound and/or a resin having in its molecule 2 or more glycidyl groups or isocyanate groups, and the content of the acrylic resin (c) is 1 to 20% by weight of the base resin (a).

3. A powder coating according to claim 1, wherein the base resin (a) is an epoxy resin having a glycidyl group, the hardener (b) is a compound having in its molecule 2 or more active hydrogen bearing groups as dicyandiamide and organic acid hydrazide, and the content of the acrylic resin (c) is 1 to 20% by weight of the base resin (a).

4. A powder coating according to claim 1, wherein the base resin (a) is an acrylic resin having an epoxy group, carboxyl group or hydroxyl group, the hardener (b) is a compound having in its molecule 2 or more carboxyl groups, epoxy groups or isocyanate groups, and the content of the acryl resin (c) is 1 to 80% by weight of the base resin (a).

* * * * *